United States Patent
Kazuma et al.

(10) Patent No.: US 7,937,266 B2
(45) Date of Patent: May 3, 2011

(54) AUDIO REPRODUCTION CIRCUIT

(75) Inventors: Shingo Kazuma, Tokyo (JP); Kenta Yamada, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1001 days.

(21) Appl. No.: 11/806,871

(22) Filed: Jun. 5, 2007

(65) Prior Publication Data
US 2008/0046234 A1 Feb. 21, 2008

(30) Foreign Application Priority Data

Aug. 17, 2006 (JP) .................................. 2006-222435

(51) Int. Cl.
*G10L 21/00* (2006.01)
(52) U.S. Cl. ....................................... 704/219; 704/500
(58) Field of Classification Search .................. 704/219, 704/225, 500, E19.023
See application file for complete search history.

(56) References Cited

U.S. PATENT DOCUMENTS

| 6,985,856 | B2 * | 1/2006 | Wang et al. | 704/226 |
| 7,302,396 | B1 * | 11/2007 | Cooke | 704/500 |
| 7,472,069 | B2 * | 12/2008 | Takagi et al. | 704/503 |

FOREIGN PATENT DOCUMENTS

JP 2005-346838 12/2005

* cited by examiner

*Primary Examiner* — Angela A Armstrong
(74) *Attorney, Agent, or Firm* — Studebaker & Brackett PC; Donald R. Studebaker (57) ABSTRACT

An audio reproduction circuit has an input buffer for holding MP3 data. The audio reproduction circuit also has an MP3 decoder for reading and decoding, in certain processing units, the MP3 data held in the input buffer, and generating voice data. The audio reproduction circuit also has an output buffer for holding the voice data supplied from the MP3 decoder. The audio reproduction circuit also has a digital-analog converter for reading the voice data from the output buffer in synchronization with a clock signal, and converting the voice data to an audio signal. A cut-out detector is provided for generating a cut-out detection (prediction) signal on the basis of the quantity of MP3 data remaining in the input buffer and the quantity of voice data remaining in the output buffer. The cut-out signal indicates a timing at which MP3 data is to be introduced to the input buffer.

11 Claims, 4 Drawing Sheets

AUDIO REPRODUCTION CIRCUIT

BACKGROUND OF THE INVENTION

1. Field of the Invention

The present invention relates to an audio reproduction circuit for reproducing voice data compressed by MP3 (MPEG audio layer 3) or another such standard, and more particularly to a way of dealing with cut-out which could occur during voice reproduction.

2. Description of the Related Art

Figure 2:
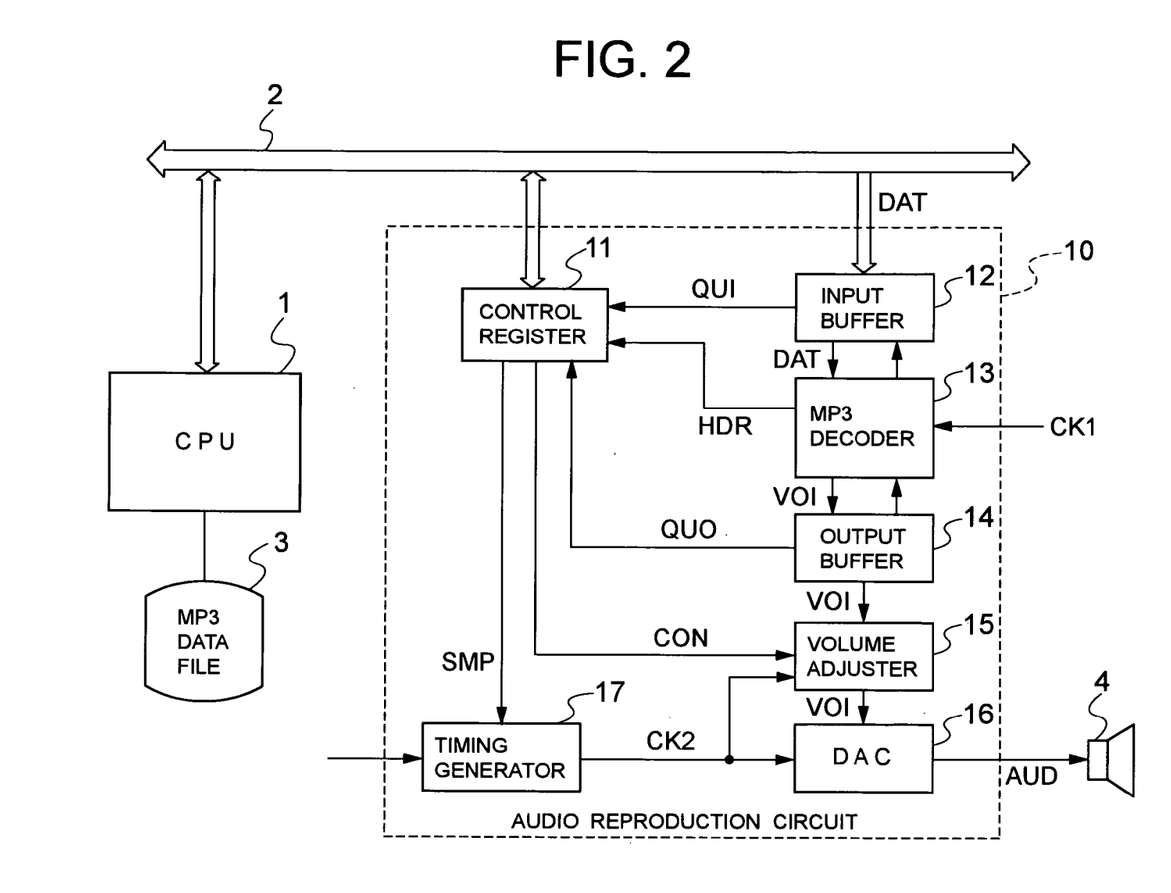
FIG. 2 illustrates the configuration of a conventional audio reproduction circuit.

FIG. 2 of the accompanying drawings illustrates an example of a conventional audio reproduction circuit 10.

The audio reproduction circuit 10 is installed, for example, in a mobile telephone or other such portable device. The audio reproduction circuit 10 is connected via a system bus 2 to a CPU (central processing unit) 1 that performs overall control on the mobile telephone (or other such portable device). The audio reproduction circuit 10 decodes MP3 data DAT given by the CPU 1, and converts the data into an audio signal AUD. The MP3 data DAT is managed by an MP3 data file 3 connected to the CPU 1. The audio signal AUD produced by the audio reproduction circuit 10 is issued as an acoustic signal (sound) from a speaker (or speakers) 4.

The audio reproduction circuit 10 has a control register 11 for the transfer of various kinds of control information and status information to and from the CPU 1, and for performing management of status within the audio reproduction circuit 10. The audio reproduction circuit 10 also has an input buffer 12 for temporarily holding MP3 data DAT provided by the CPU 1. An MP3 decoder 13 is connected to the input buffer 12. The input buffer 12 writes the quantity QUI of MP3 data DAT remaining in the buffer to the control register 11.

The MP3 decoder 13 reads the MP3 data DAT from the input buffer 12 in 576 data units called granules according to a relatively high-speed clock signal CK1, and converts the data into PCM (pulse code modulation) voice data VOI, for example. The MP3 decoder 13 writes the voice data VOI to an output buffer 14 every time one granule of MP3 data DAT is decoded. Upon reading the header information HDR of the MP3 data DAT, the MP3 decoder 13 writes the header information HDR to the control register 11.

The output buffer 14 temporarily holds the voice data VOI converted by the MP3 decoder 13, and writes the quantity QUO of voice data VOI remaining in the output buffer to the control register 11. The output buffer 14 is connected to a volume adjuster 15 that reads the voice data VOI at a specific timing and adjusts the volume according to a volume control signal CON provided by the control register 11. The volume control signal CON is given from the CPU 1 to the control register 11.

The volume adjuster 15 is also connected to a digital-analog converter (DAC) 16 that converts the volume-adjusted voice data VOI into the analog audio signal AUD, and the digital-analog converter 16 is connected to a speaker (or speakers) 4 that converts the audio signal AUD into an acoustic signal (sound). The acoustic signal is issued from the speaker(s) 4.

A clock signal CK2 for audio signal reproduction is provided from a timing generator 17 to the volume adjuster 15 and the digital-analog converter 16. The timing generator 17 generates the clock signal CK2 using a system clock or the like on the basis of the header information HDR of the MP3 data held in the control register 11.

The operation of the audio reproduction circuit 10 and CPU 1 will now be described.

When music or the like is generated (reproduced), the CPU 1 writes the MP3 data DAT to the input buffer 12 of the audio reproduction circuit 10. Once the input buffer 12 holds one granule of the MP3 data DAT, the MP3 data DAT in the input buffer 12 is read by the MP3 decoder 13, and decoding begins.

If header information HDR is included in the MP3 data DAT, the MP3 decoder 13 writes the header information HDR to the control register 11. Once the decoding of one granule of MP3 data is complete, the MP3 decoder 13 writes the resulting voice data VOI to the output buffer 14.

The timing generator 17 generates the clock signal CK2 on the basis of a sampling frequency SMP stored in the control register 11, and provides the clock signal CK2 to the volume adjuster 15 and the digital-analog converter 16. The volume adjuster 15 sequentially reads the voice data VOI from the output buffer 14 in synchronization with the clock signal CK2, and adjusts the volume of the voice data VOI according to the volume control signal CON given to the control register 11. The volume-adjusted voice data VOI is converted into the analog audio signal AUD by the digital-analog converter 16, and is issued as an acoustic signal from the speaker(s) 4.

The CPU 1 monitors the quantity QUI of MP3 data DAT remaining in the input buffer 12 and the quantity QUO of voice data VOI remaining in the output buffer 14 via the control register 11, and suitably replenishes the data in the input buffer 12 with the next MP3 data DAT in order to continuously generate an acoustic signal without cut-out (or dropout or audio discontinuity).

Such a conventional audio reproduction circuit is disclosed in, for example, Japanese Patent Application Kokai (Laid open) publication No. 2005-346838.

The following problems are encountered with the above-described audio reproduction circuit.

The CPU 1 must confirm the quantity QUI of MP3 data DAT remaining in the input buffer 12 and the quantity QUO of voice data VOI remaining in the output buffer 14 via the control register 11, and replenish the data in the input buffer 12 with the next MP3 data DAT. When there is no more voice data VOI in the output buffer 14, and there is an obvious occurrence of what is known as "cut-out," in which the audio reproduction suddenly comes to a halt, a fade-out or other such volume control signal CON that gradually reduces the volume must be sent from the CPU 1 to the control register 11.

However, in the case of a portable telephone, for example, the main job of the CPU 1 is not audio reproduction, but speech control. Thus, it is difficult for the CPU 1 to replenish the data and/or send a volume control signal appropriately by always monitoring the remaining amounts of particular data in the input and output buffers. Consequently, the timing of this monitoring may become delayed, thereby causing cut-out to occur. Increasing the capacity of the input buffer 12 is one possible way to avoid the occurrence of this cut-out, but it is often difficult to ensure adequate memory with a low-cost portable terminal. Also, since the processing of the MP3 decoder 13 is carried out in granule units, it is difficult for the CPU 1 to ascertain when the converted voice data VOI is written to the output buffer 14. Thus, cut-out can suddenly occur during audio reproduction.

SUMMARY OF THE INVENTION

It is one object of the present invention to provide an audio reproduction circuit capable of preventing sudden cut-out, without using a large buffer memory and without placing a heavy load on the CPU 1 of the device.

According to one aspect of the present invention, there is provided an improved audio reproduction circuit that includes an input buffer for receiving and temporarily holding compressed (encoded) voice data. This audio reproduction circuit also includes a decoder for reading and decoding, in certain conversion units, the voice data held in the input buffer, and generating decoded (uncompressed) voice data in conversion units. The audio reproduction circuit also includes an output buffer for temporarily holding the voice data supplied from the decoder, and a digital-analog converter for reading the voice data from the output buffer at a specific timing and in a sequential order, and converting the voice data to an audio signal. The audio reproduction circuit also includes a cut-out detection unit for predicting occurrence of cut-out on the basis of a quantity of voice data remaining in the input buffer and a quantity of voice data remaining in the output buffer, and generating a cut-out detection signal.

The cut-out detection unit predicts the occurrence of cut-out on the basis of a quantity of voice data remaining in the input buffer and a quantity of voice data remaining in the output buffer, and generates a cut-out detection signal (or cut-out prediction signal). Therefore, there is no need for the CPU, for example, to monitor the quantity of voice data remaining in the input buffer and the quantity of voice data remaining in the output buffer. Sudden cut-out can be prevented without using a large buffer memory or placing a heavy load on the CPU 1 of a portable device, if the audio reproduction circuit is provided in the portable device.

The above-mentioned and other objects, aspects and advantages of the present invention will become evident upon reading the following detailed description while referring to the appended drawings. These drawings, however, are given solely for illustrative purposes, and do not limit the scope of the present invention.

DETAILED DESCRIPTION OF THE INVENTION

Embodiment 1

Figure 1:
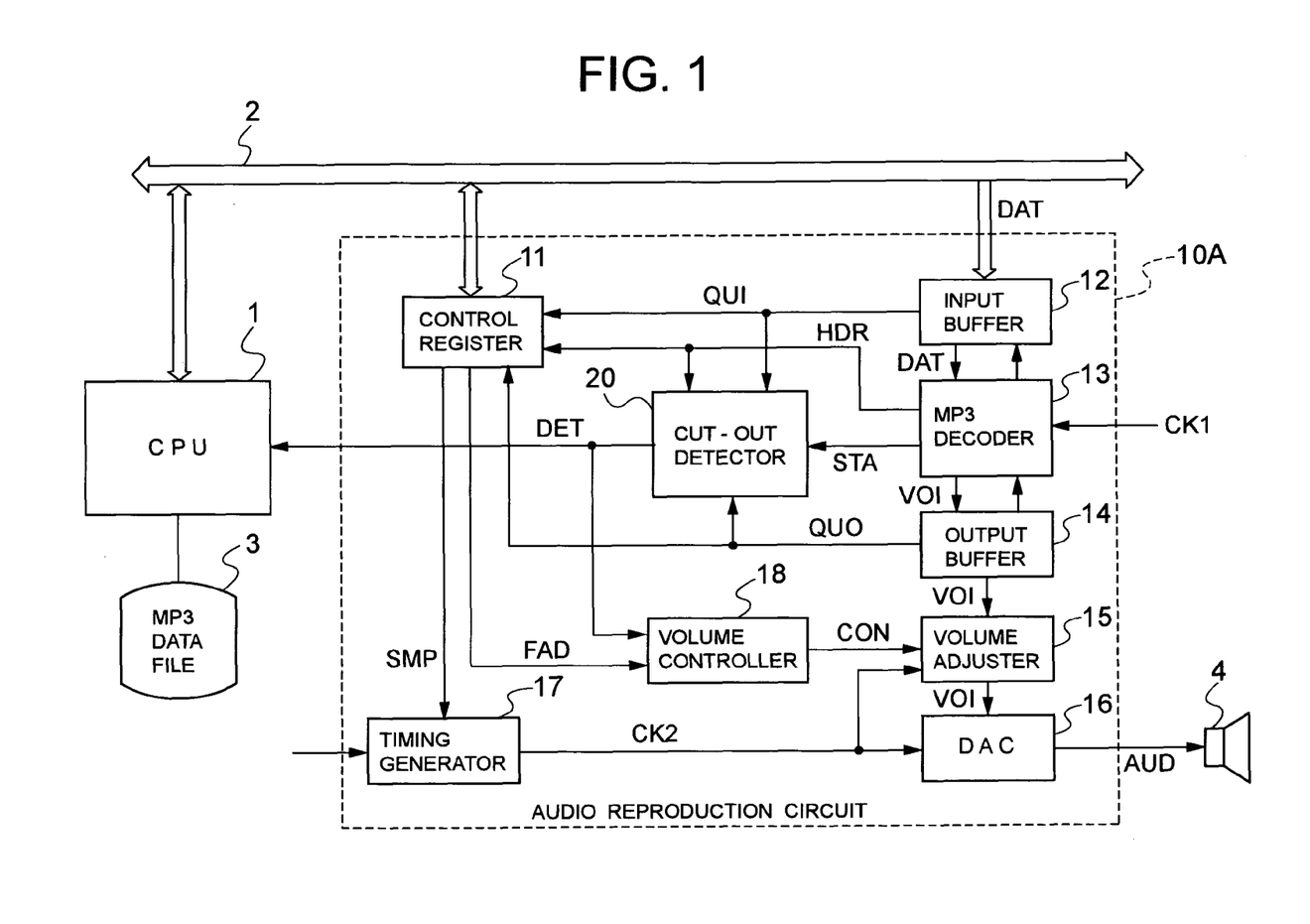
FIG. 1 is a block diagram illustrating the configuration of an audio reproduction circuit according to a first embodiment of the present invention.

Referring to FIG. 1, the configuration of an audio reproduction circuit 10A according to Embodiment 1 of the present invention will be described. Elements of the audio reproduction circuit 10A that are the same as or similar to those in FIG. 2 are assigned the same or similar reference numerals and symbols.

Similar to the audio reproduction circuit 10 shown in FIG. 2, the audio reproduction circuit 10A is installed, for example, in a mobile telephone or other such portable device. This audio reproduction circuit 10A is connected via a system bus 2 to a CPU 1 that performs overall control of the portable device. The audio reproduction circuit 10A decodes MP3 data DAT sent from the CPU 1, and converts the MP3 data DAT into an audio signal AUD. The MP3 data DAT is managed by an MP3 data file 3 connected to the CPU 1, and the audio signal AUD produced by the audio reproduction circuit 10A is sent to a speaker (or speakers) 4. The speaker 4 then issues sounds.

The audio reproduction circuit 10A has two additional elements (i.e., a volume controller 18 and a cut-out detector 20) as compared with the audio reproduction circuit 10 in FIG. 2. Similar to the audio reproduction circuit 10 of FIG. 2, the audio reproduction circuit 10A has a control register 11 for the transfer of various kinds of control information and status information to and from the CPU 1, and for performing status management within the audio reproduction circuit 10A, and an input buffer 12 for temporarily holding MP3 data DAT provided by the CPU 1. An MP3 decoder 13 is connected to the input buffer 12, and the quantity QUI of MP3 data DAT remaining in the input buffer 12 is written to the control register 11.

The MP3 decoder 13 reads the MP3 data DAT from the input buffer 12 in granule units according to a relatively high-speed clock signal CK1, and converts the data into PCM encoded voice data VOI, for example. The MP3 decoder 13 is connected to the output buffer 14 and writes the voice data VOI to the output buffer 14 every time one granule of MP3 data DAT is decoded. Upon reading the header information HDR of the MP3 data DAT, the MP3 decoder 13 writes the header information HDR to the control register 11.

The output buffer 14 temporarily holds the voice data VOI, which is provided by the MP3 decoder 13, and writes the quantity QUO of voice data VOI remaining in the output buffer 14 to the control register 11. The output buffer 14 is connected to a volume adjuster 15 that reads the voice data VOI at a specific (constant) timing and adjusts the volume.

The volume adjuster 15 adjusts the volume of the voice data VOI according to a volume control signal CON provided by the volume controller 18. The volume adjuster 15 is connected to a digital-analog converter 16 that converts the volume-adjusted voice data VOI into the analog audio signal AUD. The digital-analog converter 16 is connected to a speaker (or speakers) 4 that converts the audio signal AUD into an acoustic signal.

A clock signal CK2 for audio signal reproduction is provided from the timing generator 17 to the volume adjuster 15 and the digital-analog converter 16. The timing generator 17 generates the clock signal CK2 using a system clock or the like on the basis of the sampling frequency SMP held in the control register 11.

The cut-out detector 20 determines (predicts) whether or not cut-out will occur on the basis of the remaining quantity QUI of MP3 data DAT supplied from the input buffer 12, a decoding start signal STA supplied from the MP3 decoder 13, the header information HDR of the MP3 data DAT supplied also from the MP3 decoder 13, and the remaining quantity QUO of voice data VOI supplied from the output buffer 14. If the occurrence of the cut-out is predicted, the cut-out detector 20 generates a cut-out detection signal DET. The cut-out detection signal DET is provided as an interrupt request signal to the CPU 1. The volume controller 18 produces a volume control signal CON on the basis of a fade-out signal FAD and other signal(s) held in the control register 11 and the cut-out detection signal DET, and controls the volume adjuster 15.

Figure 3:
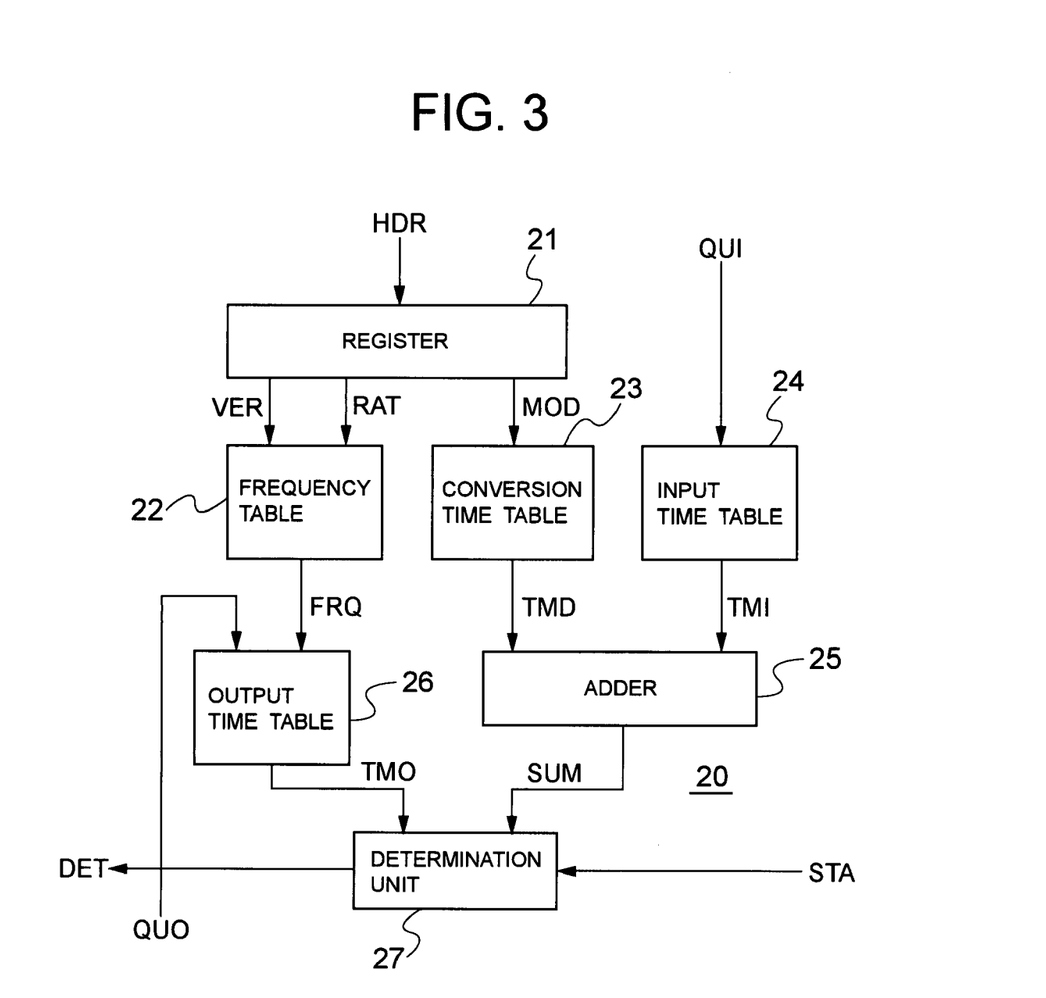
FIG. 3 illustrates the configuration of the cut-out detector shown in FIG. 1.

FIG. 3 illustrates the configuration of the cut-out detector 20 shown in FIG. 1.

The cut-out detector 20 has a register 21 for holding the header information HDR of the MP3 data DAT given from the MP3 decoder 13. The register 21 holds the MPEG version number VER, the sampling rate RAT, and a channel mode MOD indicating whether the mode is stereophonic or monophonic. The MPEG version number VER, sampling rate RAT, and channel mode MOD are all included in the header information HDR.

The MPEG version number VER and the sampling rate RAT are sent to a frequency table 22 for generating a sampling frequency FRQ. The frequency table 22 includes a nonvolatile ROM (read only memory) having an address terminal and data terminal. The frequency table 22 receives the MPEG version number VER and sampling rate RAT at the address terminal, and issues pre-stored data, as the sampling frequency FRQ, from the data terminal. This pre-stored data is stored in the nonvolatile ROM and retrieved as designated by the MPEG version number VER and sampling rate RAT.

The channel mode MOD is sent to a conversion time table 23 for generating the decoding time per granule. The conversion time table 23 has a ROM. This conversion time table 23 receives the channel mode MOD at its address terminal, and issues a decoding time TMD from its data terminal.

The cut-out detector 20 also has an input time table 24 that generates the time necessary for the CPU 1 to write the MP3 data DAT according to the remaining quantity QUI of MP3 data DAT given from the input buffer 12. The input time table 24 is made up of a ROM. The input time table 24 receives the remaining data quantity QUI at its address terminal, and issues an input time TMI (the time necessary for the CPU 1 to write the MP3 data DAT) from its data terminal. The decoding time TMD supplied from the conversion time table 23 and the input time TMI supplied from the input time table 24 are provided to an adder 25.

The adder 25 adds the decoding time TMD and the input time TMI to produce the addition result SUM, which is the time until the next output data is obtained, after decoding one granule of data.

The cut-out detector 20 has an output time table 26 for generating the remaining output time of the output buffer 14 on the basis of the remaining quantity QUO of voice data VOI supplied from the output buffer 14 and the sampling frequency FRQ supplied from the frequency table 22. The output time table 26 has a ROM. Upon receiving the sampling frequency FRQ and the quantity QUO of voice data VOI remaining in the output buffer 14 at respective address terminals, the output time table 26 produces the remaining output time TMO from its data terminal.

The addition result SUM given from the adder 25 and the output time TMO given from the output time table 26 are sent to a determination unit 27. The determination unit 27 compares the addition result SUM with the output time TMO when a decoding start signal STA is issued from the MP3 decoder 13. The determination unit 27 generates a cut-out detection signal DET of "1" if the output time TMO is smaller than the addition result SUM, and generates "0" otherwise.

The operation of the audio reproduction circuit 10A and CPU 1 will now be described.

When music or the like should be generated from the audio reproduction circuit 10A, the CPU 1 reads the MP3 data DAT from the MP3 data file 3, and writes the MP3 data DAT to the input buffer 12 of the audio reproduction circuit 10A via the system bus 2. Once the input buffer 12 holds one granule of the MP3 data DAT, the MP3 data DAT in the input buffer 12 is read by the MP3 decoder 13, and decoding begins. The quantity QUI of the MP3 data DAT remaining in the input buffer 12 is sent to the control register 11 and the cut-out detector 20.

If header information HDR is included in the MP3 data DAT, the MP3 decoder 13 sends the header information HDR to the control register 11 and the cut-out detector 20. Once the decoding of one granule of MP3 data DAT is complete, the MP3 decoder 13 writes the voice data VOI to the output buffer 14. At this point, the quantity QUO of voice data VOI remaining in the output buffer 14 is introduced to the control register 11 and the cut-out detector 20.

The timing generator 17 produces a clock signal CK2 for audio signal reproduction on the basis of the sampling frequency SMP held in the control register 11, and provides the clock signal CK2 to the volume adjuster 15 and the digital-analog converter 16. The volume adjuster 15 sequentially reads the voice data VOI from the output buffer 14 in synchronization with the clock signal CK2, and adjusts the value of the voice data VOI according to the volume control signal CON provided by the volume controller 18. The adjusted voice data VOI is sent to the digital-analog converter 16 and converted into an analog audio signal AUD. This analog audio signal AUD is issued as an acoustic signal (e.g., music) from the speaker(s) 4.

The cut-out detector 20 looks at the header information HDR of the MP3 data DAT supplied from the MP3 decoder 13, and stores in its register 21 the MPEG version number VER of the MP3 data DAT, the sampling rate RAT, and the channel mode MOD. The MPEG version number VER and the sampling rate RAT are converted by the frequency table 22 into the sampling frequency FRQ, and the channel mode MOD is converted by the conversion time table 23 into the decoding time TMD per granule.

The remaining quantity QUI of MP3 data DAT supplied from the input buffer 12 is converted by the input time table 24 into the input time TMI. The input time TMI represents a time necessary for the CPU 1 to write the MP3 data DAT. The decoding time TMD supplied from the conversion time table 23 and the input time TMI supplied from the input time table 24 are added by the adder 25, and the addition result SUM is provided. The addition result SUM is the time until one granule of MP3 data is decoded and the next output data (voice data) is obtained.

The remaining quantity QUO of voice data VOI supplied from the output buffer 14 is provided to the output time table 26 along with the sampling frequency FRQ generated from the frequency table 22, and is converted into the remaining output time TMO of the output buffer 14.

When the decoding of the MP3 data DAT by the MP3 decoder 13 begins, the decoding start signal STA is sent by the MP3 decoder 13 to the determination unit 27 of the cut-out detector 20. This causes the determination unit 27 to compare the addition result SUM with the output time TMO, and no cut-out detection signal DET is generated if the output time TMO is larger than the addition result SUM.

If the output time TMO is smaller than the addition result SUM, then the determination unit 27 generates a cut-out detection signal DET of "1." The cut-out detection signal DET of "1" is provided as an interrupt request signal to the CPU 1. The CPU 1 performs processing such as writing the next MP3 data DAT to the input buffer 12, or setting (commanding) a fade-out or other such volume control signal CON in the control register 11, upon receiving of the interrupt request signal.

As discussed above, the audio reproduction circuit 10A of the first embodiment has the cut-out detector 20 for determining in advance whether or not cut-out will occur on the basis of the header information HDR of the MP3 data DAT, the quantity QUI of MP3 data DAT remaining in the input buffer 12, and the quantity QUO of voice data VOI remaining in the output buffer 14. Therefore, if the occurrence of cut-out is predicted, a cut-out detection signal DET is generated as an interrupt request signal to the CPU 1. Thus, the CPU 1 does not have to always or regularly read the contents of the control register 11 in order to determine the occurrence of cut-out.

This means that sudden cut-out can be prevented without increasing the load on the CPU 1 of the main unit of the cell phone.

Embodiment 2

Figure 4:
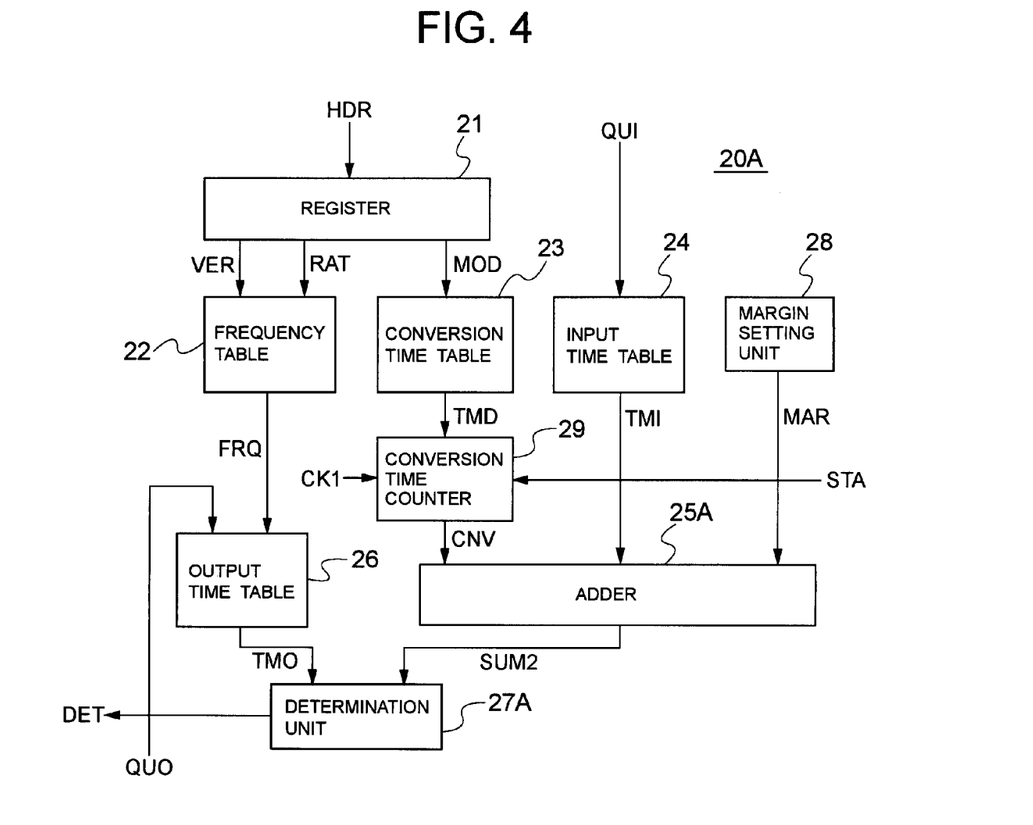
FIG. 4 illustrates the configuration of a cut-out detector according to a second embodiment of the present invention.

Referring to FIG. 4, the configuration of a cut-out detector 20A according to a second embodiment of the present invention will be described. The cut-out detector 20A is used in place of the cut-out detector 20 in FIG. 1 or 3, and those elements of the cut-out detector 20A that are similar to or the same as those in FIG. 3 are assigned similar or same reference numerals and symbols.

The cut-out detector 20A has two additional elements as compared with the cut-out detector 20 of FIG. 3. Namely, a margin setting unit 28 and a conversion time counter 29 are added to the cut-out detector 20 in FIG. 3. Also, the cut-out detector 20A has an adder 25A and a determination unit 27A in place of the adder 25 and determination unit 27, respectively. The adder 25A has slightly different functions from the adder 25, and the determination unit 27A has slightly different functions from the determination unit 27.

The margin setting unit 28 is a register for setting a margin MAR in order to issue the cut-out detection signal DET with a certain margin of time prior to actual occurrence of cut-out. This margin may be a time to be spent for writing MP3 data DAT into the input buffer 12. In other words, the margin setting unit 28 adds an additional time for cut-out prevention, and the second embodiment takes a more time for cut-out prevention as compared with the first embodiment.

The conversion time counter 29 loads the decoding time TMD from the conversion time table 23 upon receiving of a decoding start signal STA, and generates a count value CNV that is reduced one at a time in synchronization with the decoding clock signal CK1. The count value CNV is a value corresponding to the remaining conversion time required to convert the MP3 data DAT by the MP3 decoder 13.

The adder 25A adds the input time TMI given from the input time table 24, the margin time MAR decided by the margin setting unit 28, and the count value CNV of the conversion time counter 29, and generates an addition result SUM2. The addition result SUM2 is supplied to the determination unit 27A.

The determination unit 27A compares the addition result SUM2 with the output time TMO. The determination unit 27A generates a cut-out detection signal DET of "1" if the output time TMO is smaller than the addition result SUM2, and generates "0" otherwise. The rest of the configuration of the cut-out detector 20A is the same as the cut-out detector 20 shown in FIG. 3.

The cut-out detector 20A performs the following operation.

Upon receiving the header information HDR of the MP3 data DAT supplied from the MP3 decoder 13, the register 21 holds the MPEG version number VER of the MP3 data DAT, the sampling rate RAT, and the channel mode MOD. The MPEG version number VER and the sampling rate RAT are converted into the sampling frequency FRQ by the frequency table 22, and the channel mode MOD is converted into the decoding time TMD per granule by the conversion time table 23.

When the decoding start signal STA is given by the MP3 decoder 13, the decoding time TMD is loaded as the initial value of the conversion time counter 29, and thereafter the conversion time counter 29 produces a count value CNV that is reduced one at a time in synchronization with the clock signal CK1.

The remaining quantity QUI of MP3 data DAT supplied from the input buffer 12 is converted by the input time table 24 to the input time TMI which represents a time necessary for the CPU 1 to write the MP3 data DAT. Then, the count value CMV issued from the conversion time counter 29, the input time TMI issued from the input time table 24, and the margin MAR decided by the margin setting unit 28 are added by the adder 25A, and the addition result SUM2 is generated.

The remaining quantity QUO of voice data VOI supplied from the output buffer 14 is provided to the output time table 26 along with the sampling frequency FRQ supplied from the frequency table 22, and is converted into the remaining output time TMO of the output buffer 14 through the output time table 26.

The determination unit 27A compares the addition result SUM2 with the output time TMO, and produces no cut-out detection signal DET if the output time TMO is larger than the addition result SUM2.

If the output time TMO is smaller than the addition result SUM2, then the determination unit 27A generates a cut-out detection signal DET of "1." A cut-out detection signal DET of "1" is provided as an interrupt request signal to the CPU 1. The CPU 1 performs processing such as writing the next MP3 data DAT to the input buffer 12, or setting a fade-out or other such volume control signal CON in the control register 11, upon receiving the interrupt request signal.

As discussed above, the audio reproduction circuit 20A of Embodiment 2 compares the addition result SUM2, which is obtained by adding the input time TMI based on the quantity QUI of MP3 data DAT remaining in the input buffer 12, the remaining conversion time (count value CNV) obtained by subtracting the time actually spent for conversion, and the margin MAR, with the output time TMO, which is based on the quantity QUO of voice data VOI remaining in the output buffer 14, and determines (predicts) occurrence of cut-out. This allows the cut-out detection signal DET to be generated prior to the actual occurrence of the cut-out with the margin time MAR. Thus, the occurrence of cut-out does not have to be determined by the CPU 1. In the prior art, the occurrence of cut-out is determined by the CPU, and the CPU has to regularly (or always) read and check the contents of the control register 11 to make such determination.

Therefore, in addition to the advantage of being able to prevent sudden cut-out without increasing the load on the CPU 1, "cut-out" itself is eliminated by the circuit 20A because there is a margin for writing the MP3 data DAT to the input buffer 12.

The addition result SUM2 reflects the remaining conversion time CNV obtained by subtracting the time actually spent for conversion initiated by the decoding start signal STA. As a result, a cut-out detection signal DET is generated in real time on the basis of the status of the input buffer 12, the output buffer 14, and the MP3 decoder 13. Accordingly, possibility of cut-out can be determined accurately.

Modifications

The present invention is not limited to the above described and illustrated embodiments, and various changes and modifications can be made within the spirit and scope of the present invention. The following are examples of such changes and modifications.

(a) An audio reproduction circuit deals with MP3 data in the first and second embodiments, but the data compression and encoding format is not limited to MP3.

(b) The volume adjuster 15 is designed to adjust the volume of the digital voice data VOI in the first and second embodiments, but it may be designed to adjust the volume of the analog audio signal AUD.

(c) The tables 22, 23, 24, and 26 include ROMs in the first and second embodiments, but they may be constituted by a rewritable memory such as a RAM or EPROM. Thus, it is possible to employ a conversion table which will best suit for a given apparatus or equipment.

(d) Instead of the margin setting unit 28, a register may be provided in the control register 11 that allows the margin MAR to be set from the CPU 1, for example.

(e) The margin setting unit 28 may be dispensed with from the circuit shown in FIG. 4. Without the margin setting unit 28, it is still possible to predict occurrence of cut-out.

This application is based on Japanese Patent Application No. 2006-222435 filed on Aug. 17, 2006 and the entire disclosure thereof is incorporated herein by reference.

What is claimed is:

1. An audio reproduction circuit comprising:
an input buffer for receiving and temporarily holding compressed voice data;
a decoder for reading and decoding, in a certain conversion unit, the voice data held in the input buffer so as to generate uncompressed voice data in the conversion unit;
an output buffer for temporarily holding the uncompressed voice data supplied from the decoder;
a digital-analog converter for reading the uncompressed voice data from the output buffer at a predetermined timing in a sequential order, and converting the voice data to an audio signal; and
a cut-out detector for predicting occurrence of cut-out on the basis of a quantity of voice data remaining in the input buffer and a quantity of voice data remaining in the output buffer, and generating a cut-out detection signal,
wherein the cut-out detector includes:
a register for storing a version number, sampling rate, and channel mode included in a header of the voice data;
a frequency table for generating a sampling frequency on the basis of the version number and sampling rate;
a conversion time table for generating a decoding time per the conversion unit on the basis of the channel mode;
an input time table for generating an input time necessary to write next voice data to the input buffer on the basis of the quantity of voice data remaining in said input buffer;
an adder for adding the decoding time supplied from the conversion time table and the input time supplied from the input time table;
an output time table for generating remaining output time of the output buffer on the basis of the quantity of voice data remaining in said output buffer and the sampling frequency supplied from the frequency table; and
a determination unit for comparing an addition result of the adder with the output time supplied from the output time table at a timing at which the decoder begins decoding in the conversion unit, and generating the cut-out detection signal if said output time is shorter than said addition result.

2. The audio reproduction circuit according to claim 1, wherein the channel mode indicates whether the voice data is stereophonic or monophonic.

3. An audio reproduction circuit comprising:
an input buffer for receiving and temporarily holding compressed voice data;
a decoder for reading and decoding, in a certain conversion unit, the voice data held in the input buffer so as to generate uncompressed voice data in the conversion unit;
an output buffer for temporarily holding the uncompressed voice data supplied from the decoder;
a digital-analog converter for reading the uncompressed voice data from the output buffer at a predetermined timing in a sequential order, and converting the voice data to an audio signal; and
a cut-out detector for predicting occurrence of cut-out on the basis of a quantity of voice data remaining in the input buffer and a quantity of voice data remaining in the output buffer, and generating a cut-out detection signal,
wherein the cut-out detector includes:
a register for storing a version number, sampling rate, and channel mode included in a header of the voice data;
a frequency table for generating a sampling frequency on the basis of the version number and sampling rate;
a conversion time table for generating a decoding time per the conversion unit on the basis of the channel mode;
a conversion time counter for receiving as an initial value the decoding time supplied from the conversion time table at a timing at which the decoder begins decoding in the conversion unit, and subtracting time actually spent for processing of said decoder from the initial value to calculate a remaining processing time of said decoder;
an input time table for generating an input time necessary to write next voice data to the input buffer on the basis of the quantity of voice data remaining in said input buffer;
a margin setting unit for setting margin which enables generation of the cut-out detection signal prior to actual occurrence of the cut-out;
an adder for adding the remaining processing time supplied from the conversion time counter, the input time supplied from the input time table, and the margin supplied from the margin setting unit;
an output time table for generating the remaining output time of the output buffer on the basis of the quantity of voice data remaining in said output buffer and the sampling frequency supplied from the frequency table; and
a determination unit for comparing an addition result of the adder with the output time supplied from the output time table, and generating the cut-out detection signal if said output time is shorter than the addition result.

4. The audio reproduction circuit according to claim 3, wherein the channel mode indicates whether the voice data is stereophonic or monophonic.

5. An audio reproduction circuit comprising:
an input buffer for receiving and temporarily holding compressed voice data;
a decoder for reading and decoding, in a certain conversion unit, the voice data held in the input buffer so as to generate uncompressed voice data in the conversion unit;
an output buffer for temporarily holding the uncompressed voice data supplied from the decoder;
a digital-analog converter for reading the uncompressed voice data from the output buffer at a predetermined timing in a sequential order, and converting the voice data to an audio signal; and
a cut-out detector for predicting occurrence of cut-out on the basis of a quantity of voice data remaining in the input buffer and a quantity of voice data remaining in the output buffer, and generating a cut-out detection signal,
wherein the cut-out detector includes:

a register for storing a version number, sampling rate, and channel mode included in a header of the voice data;

a frequency table for generating a sampling frequency on the basis of the version number and sampling rate;

a conversion time table for generating a decoding time per the conversion unit on the basis of the channel mode;

a conversion time counter for receiving as an initial value the decoding time supplied from the conversion time table at a timing at which the decoder begins decoding in the conversion units, and subtracting time actually spent for processing of said decoder from the initial value to calculate a remaining processing time of said decoder;

an input time table for generating an input time necessary to write next voice data to the input buffer on the basis of the quantity of voice data remaining in said input buffer;

an adder for adding the remaining processing time supplied from the conversion time counter and the input time supplied from the input time table;

an output time table for generating the remaining output time of the output buffer on the basis of the quantity of voice data remaining in said output buffer and the sampling frequency supplied from the frequency table; and a determination unit for comparing an addition result of the adder with the output time supplied from the output time table, and generating the cut-out detection signal if said output time is shorter than the addition result.

6. The audio reproduction circuit according to claim 5 further comprising a margin setting unit for setting an additional time, and wherein the adder adds the remaining processing time, the input time and the margin.

7. An audio reproduction circuit comprising:

an input buffer for receiving and temporarily holding compressed voice data;

a decoder for reading and decoding, in a certain conversion unit, the voice data held in the input buffer so as to generate uncompressed voice data in the conversion unit;

an output buffer for temporarily holding the uncompressed voice data supplied from the decoder; and a cut-out detector for predicting occurrence of cut-out on the basis of a quantity of voice data remaining in the input buffer and a quantity of voice data remaining in the output buffer, and generating a cut-out detection signal, wherein the cut-out detector includes:

a register for storing a version number, sampling rate, and channel mode included in the voice data;

a frequency table for generating a sampling frequency on the basis of the version number and sampling rate;

a conversion time table for generating a decoding time per the conversion unit on the basis of the channel mode;

an input time table for generating an input time necessary to write next voice data to the input buffer on the basis of the quantity of voice data remaining in said input buffer;

an adder for adding the decoding time and the input time;

an output time table for generating remaining output time of the output buffer on the basis of the quantity of voice data remaining in said output buffer and the sampling frequency supplied from the frequency table; and a determination unit for comparing an addition result of the adder with the output time at a timing at which the decoder begins decoding in the conversion unit, and generating the cut-out detection signal if said output time is shorter than said addition result.

8. The audio reproduction circuit according to claim 7, wherein the channel mode indicates whether the voice data is stereophonic or monophonic.

9. An audio reproduction circuit comprising:

an input buffer for receiving and temporarily holding compressed voice data;

a decoder for reading and decoding, in a certain conversion unit, the voice data held in the input buffer so as to generate uncompressed voice data in the conversion unit;

an output buffer for temporarily holding the uncompressed voice data supplied from the decoder; and a cut-out detector for predicting occurrence of cut-out on the basis of a quantity of voice data remaining in the input buffer and a quantity of voice data remaining in the output buffer, and generating a cut-out detection signal, wherein the cut-out detector includes:

a register for storing a version number, sampling rate, and channel mode included in the voice data;

a frequency table for generating a sampling frequency on the basis of the version number and sampling rate;

a conversion time table for generating a decoding time per the conversion unit on the basis of the channel mode;

a conversion time counter for receiving as an initial value the decoding time at a timing at which the decoder begins decoding in the conversion unit, and subtracting time actually spent for processing of said decoder from the initial value to calculate a remaining processing time of said decoder;

an input time table for generating an input time necessary to write next voice data to the input buffer on the basis of the quantity of voice data remaining in said input buffer;

an adder for adding the remaining processing time and the input time;

an output time table for generating the remaining output time of the output buffer on the basis of the quantity of voice data remaining in said output buffer and the sampling frequency; and a determination unit for comparing an addition result of the adder with the output time, and generating the cut-out detection signal if said output time is shorter than the addition result.

10. The audio reproduction circuit according to claim 9, wherein the channel mode indicates whether the voice data is stereophonic or monophonic.

11. The audio reproduction circuit according to claim 9 further comprising a margin setting unit for setting margin, and wherein the adder adds the remaining processing time, the input time and the margin.

* * * * *